(12) United States Patent
Oishi et al.

(10) Patent No.: US 11,524,285 B2
(45) Date of Patent: Dec. 13, 2022

(54) EXHAUST GAS PURIFICATION CATALYST DEVICE

(71) Applicants: CATALER CORPORATION, Kakegawa (JP); TOYOTA JIDOSHA KABUSHIKI KAISHA, Toyota (JP)

(72) Inventors: Shunsuke Oishi, Kakegawa (JP); Takaya Ota, Kakegawa (JP); Isao Chinzei, Toyota (JP); Hiromasa Suzuki, Toyota (JP); Yoshinori Saito, Toyota (JP); Seiji Nakahigashi, Toyota (JP)

(73) Assignees: CATALER CORPORATION, Kakegawa (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 89 days.

(21) Appl. No.: 16/970,667

(22) PCT Filed: Jan. 25, 2019

(86) PCT No.: PCT/JP2019/002561
§ 371 (c)(1),
(2) Date: Aug. 18, 2020

(87) PCT Pub. No.: WO2019/163403
PCT Pub. Date: Aug. 29, 2019

(65) Prior Publication Data
US 2021/0094027 A1    Apr. 1, 2021

(30) Foreign Application Priority Data
Feb. 21, 2018  (JP) .............................. JP2018-029029

(51) Int. Cl.
*B01J 23/10*     (2006.01)
*B01J 23/46*     (2006.01)
(Continued)

(52) U.S. Cl.
CPC ........... *B01J 37/0244* (2013.01); *B01J 23/10* (2013.01); *B01J 23/464* (2013.01);
(Continued)

(58) Field of Classification Search
CPC ...... B01J 23/10; B01J 23/464; B01J 35/0006; B01J 37/0244; F01N 3/0842
See application file for complete search history.

(56) References Cited

U.S. PATENT DOCUMENTS

| 4,806,519 A | * | 2/1989 | Chiba | .................. B01D 53/945 502/252 |
| 5,177,041 A | * | 1/1993 | Horiuchi | ................ B01J 23/464 502/66 |

(Continued)

FOREIGN PATENT DOCUMENTS

| CN | 105517705 A | 4/2016 |
| JP | H07-6017 A | 1/1995 |

(Continued)

OTHER PUBLICATIONS

Mar. 26, 2019 International Search Report issued in International Patent Application No. PCT/JP2019/002561.
(Continued)

*Primary Examiner* — Cam N. Nguyen
(74) *Attorney, Agent, or Firm* — Oliff PLC

(57) ABSTRACT

The exhaust gas purification catalyst device includes an upper layer which includes first carrier particles and rhodium, and a lower layer which includes second carrier particles, and the upper layer includes a rhodium enriched area in the range a, from the upstream end in the exhaust gas flow to 50% of the upper layer length, and a range b from the upper layer top surface to 18 μm in the depth direction. The rhodium enriched area contains at least 50% and less than 100% of all the rhodium in the upper layer.

9 Claims, 1 Drawing Sheet

(51) Int. Cl.
*B01J 35/00* (2006.01)
*B01J 37/02* (2006.01)
*F01N 3/08* (2006.01)

(52) U.S. Cl.
CPC ........ *B01J 35/0006* (2013.01); *F01N 3/0842* (2013.01); *F01N 2370/02* (2013.01); *F01N 2510/0684* (2013.01)

(56) References Cited

U.S. PATENT DOCUMENTS

| | | | | |
|---|---|---|---|---|
| 7,759,283 | B2 * | 7/2010 | Yamato | B01J 37/0248 |
| | | | | 502/262 |
| 8,202,819 | B2 * | 6/2012 | Kohara | B01J 23/10 |
| | | | | 502/304 |
| 8,337,791 | B2 * | 12/2012 | Kohara | B01D 53/945 |
| | | | | 60/299 |
| 8,491,847 | B2 * | 7/2013 | Kato | B01D 53/945 |
| | | | | 422/177 |
| 8,580,705 | B2 * | 11/2013 | Aoki | B01J 37/0248 |
| | | | | 502/304 |
| 9,475,004 | B2 * | 10/2016 | Hatfield | B01D 53/9454 |
| 9,475,005 | B2 * | 10/2016 | Hatfield | B01J 23/002 |
| 9,540,980 | B2 * | 1/2017 | Hilgendorff | B01J 35/1019 |
| 9,833,771 | B2 * | 12/2017 | Goto | B01J 35/0006 |
| 9,890,676 | B2 * | 2/2018 | Kawabata | B01J 35/0006 |
| 10,556,223 | B2 * | 2/2020 | Suzuki | B01J 37/031 |
| 10,576,420 | B2 * | 3/2020 | Chinzei | C01F 17/224 |
| 10,634,030 | B2 * | 4/2020 | Li | B01J 37/0201 |
| 11,110,396 | B2 * | 9/2021 | Minami | B01J 23/002 |
| 11,149,610 | B2 * | 10/2021 | Li | F01N 3/0842 |
| 2003/0103886 | A1 * | 6/2003 | Dou | B01J 37/0244 |
| | | | | 423/239.1 |
| 2004/0082470 | A1 * | 4/2004 | Gandhi | B01J 37/0244 |
| | | | | 502/325 |
| 2008/0081762 | A1 | 4/2008 | Kitamura et al. | |
| 2009/0275468 | A1 | 11/2009 | Taki et al. | |
| 2010/0075841 | A1 | 3/2010 | Chiba et al. | |
| 2010/0167920 | A1 | 7/2010 | Uemura et al. | |
| 2016/0158699 | A1 | 6/2016 | Cavataio et al. | |
| 2016/0199815 | A1 | 7/2016 | Hoshino et al. | |
| 2016/0256854 | A1 | 9/2016 | Aoki | |
| 2021/0197176 | A1 * | 7/2021 | Chinzei | B01J 35/0013 |

FOREIGN PATENT DOCUMENTS

| | | |
|---|---|---|
| JP | 2001-252565 A | 9/2001 |
| JP | 2008-302304 A | 12/2008 |
| JP | 2011-255378 A | 12/2011 |
| JP | 2015-73943 A | 4/2015 |
| JP | 2015-85241 A | 5/2015 |
| JP | 2016-513014 A | 5/2016 |
| JP | 2017-039659 A | 2/2017 |
| JP | 2017-082716 A | 5/2017 |
| WO | 2006/057067 A1 | 6/2006 |
| WO | 2008/038834 A1 | 4/2008 |
| WO | 2008/091004 A1 | 7/2008 |
| WO | 2014/132034 A1 | 9/2014 |

OTHER PUBLICATIONS

Mar. 26, 2019 Written Opinion issued in International Patent Application No. PCT/JP2019/002561.

* cited by examiner

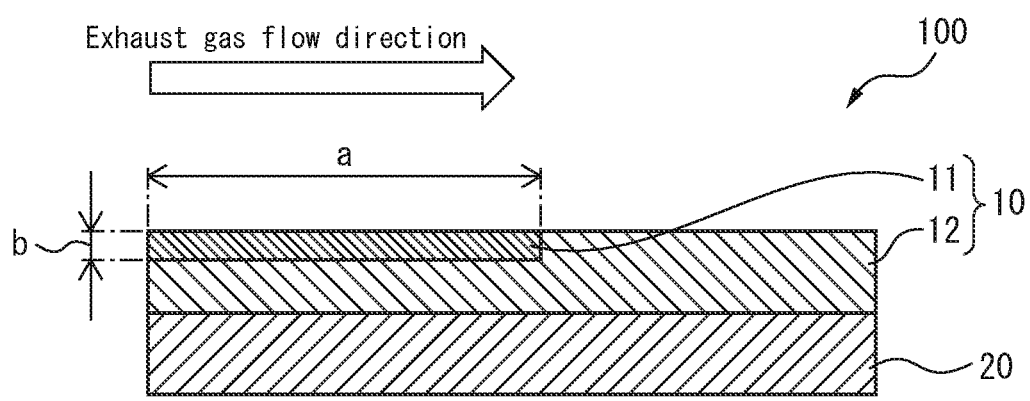

EXHAUST GAS PURIFICATION CATALYST DEVICE

FIELD

The present invention relates to an exhaust gas purification catalyst device.

BACKGROUND

Exhaust gas purification catalysts are used to purify, for example, HC, CO, and $NO_x$ which are contained in the exhaust gas from internal combustion engines of automobiles. Such exhaust gas purification catalysts typically comprise a substrate having formed thereon a catalyst coating layer which contains an inorganic oxide and a precious metal.

In such exhaust gas purification catalysts, there has been proposed a technology in which a catalyst coating has a two-layer structure comprising a lower layer containing Pd and an upper layer containing Rh, whereby the catalytic performance thereof is improved (Patent Literature 1). Furthermore, there has been proposed a technology in which Pd contained in a lower layer and Rh contained in an upper layer are unevenly distributed near the surface of the respective layers, whereby the utilization rate of the Pd and the Rh is increased (Patent Literature 2).

Patent Literature 3 is known to disclose a method in which a precious metal is carried on a substrate using a precious metal solution.

Conventionally, the catalyst coating layer in an exhaust gas purification catalyst device as described above is formed on a substrate which itself does not have an exhaust gas purification capability, such as, for example, a cordierite honeycomb substrate. However, in recent years, there has been proposed an exhaust gas purification catalyst in which a precious metal is supported on a substrate composed of inorganic oxide particles (Patent Literature 4).

CITATION LIST

Patent Literature

[PTL 1] Japanese Unexamined Patent Publication (Kokai) No. 7-6017
[PTL 2] Japanese Unexamined Patent Publication (Kokai) No. 2011-255378
[PTL 3] Japanese Unexamined Patent Publication (Kokai) No. 2008-302304
[PTL 4] Japanese Unexamined Patent Publication (Kokai) No. 2015-85241

SUMMARY

Technical Problem

In conventionally known exhaust gas purification catalyst devices, for example, it is not possible to sufficiently meet the demand for improvement of exhaust gas purification capacity during warm-up, such as when an engine is started.

The object of the present invention is to provide an exhaust gas purification catalyst device which can exhibit a sufficiently high exhaust gas purification capacity even, for example, during warm-up, such as when an engine is started.

Solution to Problem

The present invention is as described below.
<Aspect 1> An exhaust gas purification catalyst, comprising:
an upper layer containing first carrier particles and rhodium, and
a lower layer containing second carrier particles, wherein
the upper layer includes a rhodium-rich portion in a range of up to 50% of the length of the upper layer from an upstream side end of an exhaust gas flow and of up to 18 μm in the depth direction from an outermost surface of the upper layer, and
the rhodium-rich portion contains rhodium in an amount of 50% to less than 100% of the total rhodium included in the upper layer.
<Aspect 2> The exhaust gas purification catalyst device according to <Aspect 1>, wherein the range of the rhodium-rich portion in an exhaust gas flow direction is up to 30% of the length of the upper layer from the upper layer exhaust stream flow upstream side end.
<Aspect 3> The exhaust gas purification catalyst device according to <Aspect 2>, wherein the range of the rhodium-rich portion in the depth direction is up to 15 μm in the depth direction from the outermost surface of the upper layer.
<Aspect 4> The exhaust gas purification catalyst device according to any one of <Aspect 1> to <Aspect 3>, wherein a content of ceria in the upper layer is greater than 5% by mass to 25% by mass or less, when the total mass of the first carrier particles in the upper layer is 100% by mass.
<Aspect 5> The exhaust gas purification catalyst device according to <Aspect 4>, wherein the content of ceria in the upper layer is 7% by mass to 15% by mass, when the total mass of the first carrier particles in the upper layer is 100% by mass.
<Aspect 6> The exhaust gas purification catalyst device according to any one of <Aspect 1> to <Aspect 5>, wherein rhodium equal to 50% or more of the rhodium included in the rhodium-rich portion is in a range of up to 50% of the length of the rhodium-rich portion from the upstream side end of the exhaust gas flow.
<Aspect 7> The exhaust gas purification catalyst device according to any one of <Aspect 1> to <Aspect 6>, wherein the lower layer and the upper layer are present on a substrate.
<Aspect 8> The exhaust gas purification catalyst according to any one of <Aspect 1> to <Aspect 6>, wherein the lower layer constitutes a part or the entirety of a substrate, and the upper layer is present on the lower layer.
<Aspect 9> A method for the production of the exhaust gas purification catalyst device according to any one of <Aspect 1> to <Aspect 8>, comprising the steps of:
providing a coating liquid including a rhodium precursor to an exhaust gas upstream side end of an exhaust gas purification catalyst device precursor comprising an upper layer containing first carrier particles and rhodium and a lower layer containing second carrier particles, and thereafter suctioning from an exhaust gas downstream side end of the exhaust gas purification catalyst device precursor.

Advantageous Effects of Invention

According to the present invention, there is provided an exhaust gas purification catalyst device which can exhibit a sufficiently high exhaust gas purification capacity even during warm-up.

BRIEF DESCRIPTION OF DRAWINGS

FIG. 1 is a schematic cross-sectional view illustrating the typical structure of an exhaust gas purification catalyst device according to the present invention.

DESCRIPTION OF EMBODIMENTS

<<Exhaust Gas Purification Catalyst Device>>

The typical structure of the exhaust gas purification catalyst device of the present invention is shown in FIG. 1.

The exhaust gas purification catalyst device (100) of FIG. 1 comprises:

an upper layer (10) containing first carrier particles and rhodium, and a lower layer (20) containing second carrier particles, wherein the upper layer (10) includes a rhodium-rich portion (11) in a range of (a) up to 50% of the length of the upper layer from an upstream side end of an exhaust gas flow and of (b) up to 18 μm in the depth direction from an outermost surface of the upper layer, and the rhodium-rich portion (11) contains rhodium in an amount of 50% to less than 100% of the total rhodium included in the upper layer (10).

The upper layer (10) of the exhaust gas purification catalyst device (100) of FIG. 1 is composed of the rhodium-rich portion (11) near the surface of the upper layer on the upstream side of the exhaust gas flow and the other portions (12) of the upper layer.

The rhodium-rich portion (11) contains rhodium in an amount of 50% to less than 100% of the total rhodium included in the upper layer (10).

By concentrating the rhodium included in the upper layer on the upstream side of the exhaust gas flow, even when the temperature of the exhaust gas purification device is low, such as during warm-up, $NO_x$ can be efficiently purified using HC and CO at the rhodium-rich portion on the upstream side of the flow. Further, exhaust gas purification on the downstream side is promoted by the reaction heat generated by the purification reaction of the rhodium-rich portion.

Furthermore, by concentrating the rhodium near the surface of the upper layer, even when the mass flow rate is high, since the likelihood of the exhaust gas coming into contact with the rhodium can be increased, efficient exhaust gas purification becomes possible.

The structure of an exhaust gas purification catalyst device as an example of a preferred embodiment (hereinafter referred to as "the present embodiment") of the exhaust gas purification catalyst device of the present invention will be described.

(Rhodium-Rich Portion)

The rhodium-rich portion of the exhaust gas purification catalyst device of the present embodiment is arranged in the upper layer containing the first carrier particles and rhodium in a range of up to 50% of the length of the upper layer from an upstream side end of an exhaust gas flow and of up to 18 μm in the depth direction from an outermost surface of the upper layer.

The range of the rhodium-rich portion in the exhaust gas flow direction is within the range of up to 50% of the length of the upper layer from the upstream side end of the exhaust gas flow. When the rhodium-rich portion is arranged within the range of up to 50% of the length of the upper layer from the upstream side end of the exhaust gas flow, the degree of concentration of the rhodium becomes sufficiently high, and as a result, reaction heat sufficient to warm the downstream side of the catalyst coating layer can be generated, even during warm-up. The range of the rhodium-rich portion in the exhaust gas flow direction may be within a range of up 45%, up to 40%, up to 35%, up to 30%, or up to 25% of the length of the upper layer from the upstream side of the exhaust gas flow.

Conversely, for efficient exhaust gas purification, it is desirable that the rhodium-rich portion in which rhodium is concentrated have a significant length. From this viewpoint, the range of the rhodium-rich portion in the exhaust gas flow direction may be arranged across a range of 5% or more, 10% or more, 15% or more, or 20% or more of the length of the upper layer from the upstream side end of the exhaust gas flow.

The range of the rhodium-rich portion in the depth direction of the catalyst coating layer is a range of up to 18 μm in the depth direction from the outermost surface of the upper layer. As used herein, "outermost surface of the upper layer" refers to the surface on the side of the upper layer contacting the exhaust gas flow, i.e., the surface on the side opposite the surface which contacts the lower layer. When the rhodium-rich portion is arranged within a range of up to 18 μm in the depth direction from the outermost surface of the upper layer, even when the space velocity (SV) of the exhaust gas is high, the exhaust gas can diffuse across the entirety of the depth direction of the rhodium-rich portion, whereby the rhodium can be efficiently used. The range of the rhodium-rich portion in the depth direction of the catalyst coating layer may be up to 17 μm, 16 μm, 15 μm, 14 μm, or 13 μm in the depth direction from the outermost surface of the upper layer.

The content of rhodium in the rhodium-rich portion is within the range of 50% to less than 100% of the total rhodium included in the upper layer. By setting the rhodium content of the rhodium-rich layer to 50% or more of the total rhodium of the upper layer, the effect of concentration of the rhodium in the rhodium-rich portion can be sufficiently exhibited. Conversely, by restraining the rhodium content of the rhodium-rich portion to less than 100% and arranging a small amount of rhodium in the other portions of the upper layer, oxygen release from an oxygen release material (OSC material, e.g., ceria) optionally included in the upper layer is promoted. Thus, under, for example, rich conditions, it becomes easy to maintain the atmosphere in the catalyst coating layer near stoichiometry, whereby exhaust gas purification capacity is maintained at a high level. The content of rhodium in the other portions of the upper layer other than the rhodium-rich portion will be described later.

As described above, in the exhaust gas purification catalyst device of the present embodiment, by concentrating the rhodium in the upper layer on the upstream side of the exhaust gas flow purification efficiency can be increased during warm-up. Thoroughly pursuing this purpose, by providing a concentration gradient within the range of the rhodium-rich portion and further concentrating a relatively large amount of rhodium on the upstream side, catalytic efficiency during warm-up can be further increased.

From such a viewpoint, in the rhodium-rich portion, rhodium in an amount of 50% or more of the rhodium included in the rhodium-rich portion may be arranged in the range of up to 50% of the length of the rhodium-rich portion from the upstream side end of the exhaust gas flow. The content of rhodium included in this range may be 51% or more, 53% or more, 55% or more, 57% or more, 58% or more, 60% or more, or 65% or more of the rhodium included in the rhodium-rich portion.

Conversely, for efficient exhaust gas purification, it is desirable that the rhodium-rich portion contain a significant amount of rhodium across the entire length thereof. From this viewpoint, in the rhodium-rich portion, the ratio of rhodium arranged in the range of up to 50% of the length of the rhodium-rich portion from the upstream side end of the exhaust gas flow may be 80% or less, 75% or less, 70% or less, 65% or less, or 60% or less of the rhodium included in the rhodium-rich portion.

The rhodium-rich portion constitutes a part of the upper layer. Thus, regarding the composition of the rhodium-rich portion, aside from the rhodium content, the descriptions of the upper layer described below equally correspond thereto. For example, the rhodium included in the rhodium-rich portion may be carried on the first carrier particles included in the upper layer.

<Upper Layer>

The upper layer of the exhaust gas purification catalyst device of the present embodiment contains the first carrier particles and rhodium.

(First Carrier Particles)

The first carrier particles may be particles of an inorganic oxide.

The inorganic oxide constituting the first carrier particles may be one or more oxides such as, for example, aluminum, silicon, zirconium, titanium, and rare earth elements. The inorganic oxide is preferably one or more selected from alumina, silica, silica-alumina, zeolite, titania, zirconia, ceria, and oxides of rare earth elements other than ceria. It is particularly preferable that the inorganic oxide contain alumina and zirconia, or contain alumina and a ceria-zirconia composite oxide (CZ). The case in which an oxide of a rare earth element other than ceria is contained together with alumina and zirconia or alumina and CZ is also a preferable aspect of the present embodiment.

In the upper layer of the exhaust gas purification catalyst of the present embodiment, the content of ceria may be in the range of 25% by mass or less, when the total mass of the first carrier particles in the upper layer is 100% by mass. It is preferable that the content of the ceria in the upper layer be limited for the following reasons.

Since the catalyst coating layer contains ceria having an oxygen storage capacity, the catalyst coating layer can be maintained near stoichiometry even under rich conditions or lean conditions. Conversely, it is necessary that rhodium be promptly reduced and activated during warm-up, for example, when the engine is started. If the amount of ceria in the catalyst coating layer is excessively large, the amount of oxygen released from ceria will be excessively large and the reduction of rhodium will be delayed, which may prevent early activation of the exhaust gas purification catalyst device. To avoid this, the content of ceria in the upper layer is preferably limited to a predetermined value or less.

From the viewpoints described above, the content of ceria of the upper layer may be 25% by mass or less, 23% by mass or less, 20% by mass or less, 18% by mass or less, or 15% by mass or less, when the total mass of the first carrier particles in the upper layer is 100% by mass. Conversely, from the viewpoint of maintaining the state of the catalyst coating layer near stoichiometry, the upper layer may contain ceria in a range which does not delay rapid reduction of the rhodium when starting the engine. Thus, the content of ceria of the upper layer may be a quantity exceeding 5% by mass, and may be, for example, 6% by mass or more, 7% by mass or more, 8% by mass or more, or 10% by mass or more, when the total mass of the first carrier particles in the upper layer is 100% by mass. The case in which the content of ceria of the upper layer is in the range of greater than 5% by mass to 25% by mass or less, or 7% to 15% by mass, when the total mass of the first carrier particles in the upper layer is 100% by mass, is a preferred aspect of the present embodiment.

When the cerium atom is a part of the composite oxide (for example, CZ), the content of ceria means the amount converted into the composition of $CeO_2$.

The first carrier particles may be primary particles or may be secondary particles in which primary particles are agglomerated.

The average particle diameter of the first carrier particles may be, for example, 1 μm or more, 3 μm or more, 5 μm or more, or 10 μm or more, and may be, for example, 50 μm or less, 40 μm or less, 30 μm or less, or 20 μm or less.

(Rhodium)

The upper layer contains rhodium. The rhodium may be carried on the first carrier particles in the upper layer.

The content of rhodium of the upper layer, as a metal conversion mass of rhodium per unit volume of the substrate, may be, for example, 0.01 g/L or more, 0.05 g/L or more, 0.10 g/L or more, or 0.15 g/L or more, and may be, for example, 0.50 g/L or less, 0.40 g/L or less, 0.35 g/L or less, or 0.30 g/L or less.

The rhodium may be included in the rhodium-rich portion of the upper layer and the other portions of the upper layer.

As described above, when the entirety of the rhodium in the upper layer is arranged in the rhodium-rich portion and no rhodium is included in the other portions of the upper layer at all, oxygen is less likely to be released from the OSC material optionally included in the upper layer, and it may be difficult to maintain the atmosphere in the catalyst coating layer near stoichiometry, resulting in impaired exhaust gas purification capacity. To prevent this, the portions of the upper layer other than the rhodium-rich portion may contain, as a metal conversion mass of rhodium per unit volume of the substrate, for example, 0.01 g/L or more, 0.02 g/L or more, 0.03 g/L or more, 0.04 g/L or more, or 0.05 g/L or more of rhodium.

In order to concentrate the rhodium in the rhodium-rich portion to develop the effect of the present invention of improving exhaust gas purification capacity during warm-up, the content of rhodium in the portions of the upper layer other than the rhodium-rich portion may be, as a metal conversion mass of rhodium per unit volume of the substrate, for example, 0.12 g/L or less, 0.10 g/L or less, or 0.08 g/L or less.

(Optional Components of Upper Layer)

The upper layer may include options components other than the first carrier particles and rhodium.

Examples of optional components of the upper layer include precious metals other than rhodium, alkali metal compounds, alkaline earth metal compounds, transition metals, and binders.

The precious metal other than rhodium may be, for example, a platinum-group metal other than rhodium, and specifically, is one or more selected from, for example, palladium and platinum. However, since the exhaust gas purification catalyst device of the present embodiment can exhibit sufficiently high exhaust gas purification capacity without the inclusion of a precious metal other than rhodium in the upper layer, a precious metal other than rhodium may not be arranged in the upper layer.

Examples of alkali metal compounds include potassium compounds and lithium compounds. Examples of alkaline earth metal compounds include calcium compounds, barium compounds, and strontium compounds. These have the effect of improving the heat resistance of the resulting catalyst.

The binder adheres the first carrier particles to each other and the first carrier particles to the lower layer, and has a function of imparting mechanical strength to the catalyst coating layer. Examples of such a binder include alumina sol, zirconia sol, silica sol, and titania sol.

(Upper Layer Coating Amount)

The coating amount of the upper layer, as the mass of the upper layer per unit volume of the substrate, may be, for example, 50 g/L or more, 60 g/L or more, 70 g/L or more, or 80 g/L or more, and may be, for example, 300 g/L or less, 250 g/L or less, 200 g/L or less, or 150 g/L or less.

(Lower Layer)

The lower layer of the exhaust gas purification catalyst of the present embodiment contains second carrier particles. The lower layer may contain, in addition to the second carrier particles, a precious metal and other optional components.

(Second Carrier Particles)

The second carrier particles included in the lower layer may be appropriately selected and used from those exemplified above as the first carrier particles included in the upper layer.

(Precious Metal)

The lower layer may contain precious metals. These precious metals may be carried on the second carrier particles in the lower layer.

The precious metal of the lower layer may be a platinum-group metal, and is one or more selected from, for example, rhodium, palladium, and platinum. In order to efficiently exhibit the effect of the exhaust gas purification catalyst device of the present invention, it is appropriate from rhodium to be concentrated in the upper layer. From this viewpoint, the content of rhodium contained in the lower layer may be less than 50%, and may be 30% or less, 10% or less, 5% or less, or 1% or less, when the total rhodium contained in the exhaust gas purification catalyst device of the present invention is 100%. The lower layer may not contain rhodium at all.

The lower layer may contain a precious metal other than rhodium, which is preferable.

The precious metal other than rhodium of the lower layer may be, for example, a platinum-group metal other than rhodium, and specifically, is, for example, one or more selected from palladium and platinum. The content of the precious metal other than rhodium of the lower layer, per unit volume of the substrate, may be, for example, 0.1 g/L or more, 0.2 g/L or more, 0.3 g/L or more, 0.4 g/L or more, or 0.5 g/L or more, and may be, for example, 1.0 g/L or less, 0.8 g/L or less, 0.7 g/L or less, or 0.6 g/L or less.

(Optional Components of Lower Layer)

The lower lay may contain, in addition to the second carrier particles and the optionally arranged precious metal, optional components other than these.

Examples of the optional components of the lower layer include alkali metal compounds, alkaline earth metal compounds, transition metals, and binders. These are the same as those described above as optional components of the upper layer.

(Lower Layer Coating Amount)

The coating amount of the lower lay, as the mass of the lower layer per unit volume of the substrate, may be, for example, 50 g/L or more, 60 g/L or more, 70 g/L or more, or 80 g/L or more, and may be, for example, 300 g/L or less, 250 g/L or less, 200 g/L or less, or 150 g/L or less.

<Substrate>

In the exhaust gas purification catalyst device of the present embodiment, the lower layer and the upper layer as described above may be present, in this order, on a substrate, or the lower lay may constitute a part or the entirety of the substrate and the upper layer may be present on the lower layer, which is a part or the entirety of the substrate. In either case, the capacity of the substrate may be, for example, approximately 1 L.

As the substrate in the case in which the lower layer and the upper layer are present on a substrate, those which are generally used as the substrates of exhaust gas purification catalyst devices can be used. For example, the substrate may be composed of a material such as cordierite, SiC, stainless steel, and inorganic oxide particles, and may be, for example, a monolithic honeycomb substrate.

In the case in which the lower layer constitutes a part or the entirety of the substrate, the substrate may be composed of inorganic oxide particles, and a part or the entirety of the inorganic oxide particles may be of the same type as the second carrier particles of the lower layer. The substrate in this case may also be, for example, a monolithic honeycomb substrate.

<<Exhaust Gas Purification Catalyst Device Production Method>>

The exhaust gas purification catalyst device of the present embodiment may be produced by a method comprising, for example, providing a coating liquid including a rhodium precursor to an exhaust gas upstream side end of an exhaust gas purification catalyst device precursor comprising an upper layer containing first carrier particles and rhodium and a lower layer containing second carrier particles, and thereafter suctioning from an exhaust gas downstream side end of the exhaust gas purification catalyst device precursor.

<Preparation of Exhaust Gas Purification Catalyst Device Precursor>

The exhaust gas purification catalyst device precursor may be produced by, for example: a method in which a lower layer containing second carrier particles and an upper layer containing first carrier particles and rhodium are formed in this order on a substrate (first method), or a method comprising forming a substrate, and forming an upper layer containing first carrier particles and rhodium on the obtained substrate, wherein a part or the entirety of the substrate is constituted by a lower layer containing second carrier particles (second method).

According to the first method described above, an exhaust gas purification catalyst device precursor comprising a lower layer and an upper layer on a substrate is obtained. According to the second method, the lower layer constitutes a part or the entirety of the substrate, and an exhaust gas purification catalyst device precursor comprising an upper layer on the lower layer, which is a part or the entirety of the substrate, is obtained. The first and second methods will be described in order below.

<Exhaust Gas Purification Catalyst Device Precursor Preparation (First Method)>

(Substrate)

In the first method for preparing the exhaust gas purification catalyst device precursor, as the substrate, a predetermined substrate which should be included in the exhaust gas purification catalyst device may be selected and used. The substrate is, for example, a monolithic honeycomb substrate composed of cordierite or inorganic oxide particles, as described above.

(Lower Layer Formation)

The lower layer can be formed by applying a lower layer formation coating liquid containing the material of the lower layer or a precursor thereof to such a substrate and firing after removal of the solvent as necessary.

Since the lower layer of the exhaust gas purification catalyst device precursor of the present embodiment contains the second carrier particles, the lower layer formation coating liquid may also contain second carrier particles suitably selected from among those described above.

Like the lower layer of the exhaust gas purification catalyst device, the lower layer of the exhaust gas purification catalyst device precursor may contain precious metals, preferably one or more selected from palladium and platinum. In this case, by including precursors of the desired precious metals in the lower layer formation coating liquid, these precious metals can be contained in the obtained lower layer. The precursors of the precious metals may be, for example, halides, nitrates, or sulfates of the desired precious metals.

In addition to the second carrier particles and the optionally used precious metal precursors, the optional components of the lower layer described above may be included in the lower layer formation coating liquid.

The solvent of the lower layer formation coating liquid may typically be water.

The lower layer can be formed by applying such a lower layer formation coating liquid onto the surface of the substrate and firing after removing the solvent as necessary.

As a coating method, a known method such as a dipping method or a pouring method can be adopted without limitation. The coating amount is appropriately selected in accordance with the desired coating layer amount.

Firing after coating can be carried out in accordance with a method of heating at a temperature of, for example, 400 to 800° C., preferably 450 to 600° C., for a time of, for example, 5 minutes to 4 hours, preferably 30 minutes to 3 hours. The ambient atmosphere during firing may be air.

(Upper Layer Formation)

The lower layer can be formed by next applying an upper layer formation coating liquid comprising the material of the upper layer or a precursor thereof to the lower layer formed as described above, and firing after removal of the solvent as necessary.

Since the upper layer of the exhaust gas purification catalyst device precursor of the present embodiment contains the first carrier particles, the upper layer formation coating liquid may also contain first carrier particles appropriately selected from among those described above.

Like the upper layer of the exhaust gas purification catalyst device, the upper layer of the exhaust gas purification catalyst device precursors contains rhodium. In this case, by including a rhodium precursor in the upper layer formation coating liquid, rhodium can be contained in the upper layer to be obtained. The rhodium precursor may be, for example, rhodium nitrate, rhodium chloride, sodium rhodium chloride, rhodium chloride pentaamine, or carbonyl acetyl rhodium.

In addition to the first carrier particles and the rhodium precursor, the optional components of the upper layer described above may be contained in the upper layer formation coating liquid.

The solvent of the upper layer coating liquid may typically be water.

By applying such an upper layer coating liquid onto the surface of the lower layer on the substrate and firing after removing the solvent as necessary, the upper layer can be formed, whereby the exhaust gas purification catalyst device precursor can be obtained.

The application and firing of the upper layer formation coating liquid may be carried out in the same manner as the application and firing of the lower layer formation coating liquid.

<Exhaust Gas Purification Catalyst Device Precursor Preparation (Second Method)>

(Substrate Formation)

In the second method, first, the substrate is formed. A part or the entirety of the substrate is constituted by the lower layer containing the second carrier particles. When the desired lower layer of the present embodiment is a part of the substrate, it is desirable that the lower layer constitute the surface of the substrate.

Formation of the substrate in the second method can be carried out in accordance with, for example, the method described in Patent Literature 4 using the second carrier particles of the desired lower layer of the present embodiment as a part or the entirety of the inorganic oxide particles constituting the substrate.

When the lower layer constitutes a part or the entirety of the substrate, the substrate can be obtained by press-forming a substrate formation composition and carrying out drying and firing. The substrate formation composition can be obtained by, for example, mixing the second carrier particles of the desired lower layer of the present embodiment with other inorganic oxide particles as necessary, further adding thereto water and a binder, and kneading.

When a precious metal other than rhodium is included in the desired lower layer, a precursor of the desired precious metal, such as, for example, a halide, nitrate, or sulfate thereof, may be included in the substrate formation composition, and after formation of the lower layer in which the precious metal is not included, formation may be carried out by a method in which the lower layer is impregnated with a solution of the precursor of the desired precious metal and fired. According to this method, a substrate constituted by a lower layer material including the precious metal other than rhodium can be obtained.

(Upper Layer Formation)

The upper layer is next formed on the lower layer formed as descried above, whereby the exhaust gas purification catalyst device precursor can be obtained. This upper layer formation may be carried out in the same manner as the upper layer formation of the first method.

<Rhodium-Rich Portion Formation>

Next, the desired exhaust gas purification catalyst device of the present embodiment can be obtained by forming the rhodium-rich portion on a predetermined range of the upper layer of the exhaust gas purification catalyst device precursor.

The rhodium-rich portion may be formed by a method comprising the steps of arranging a rhodium-rich portion formation coating liquid containing a rhodium precursor on the exhaust gas upstream side end of the exhaust gas purification catalyst device precursor, and thereafter suctioning from the exhaust gas downstream side end of the exhaust gas purification catalyst device precursor.

The rhodium-rich portion formation coating liquid contains a rhodium precursor, and in some cases, may further contain a thickener.

The rhodium precursor may be, for example, rhodium nitrate, rhodium chloride, sodium rhodium chloride, rhodium chloride pentaamine, or carbonyl acetyl rhodium.

The thickener may be appropriately selected and used from cellulose-based thickeners, water-soluble polymers, and thickeners derived from natural products.

The cellulosed-based thickener may be selected from, for example, methyl cellulose, ethyl cellulose, carboxymethyl cellulose, carboxyethyl cellulose, hydroxymethyl cellulose, hydroxyethyl cellulose, and hydroxypropyl methyl, as well as sodium salts and calcium salts thereof. The water-soluble polymer may be selected from polyvinyl alcohol and polyvinyl pyrrolidone. The thickener derived from natural products may be selected from, for example, xanthan gum and gelatin.

The solvent of the rhodium-rich portion formation coating liquid may typically be water.

The rhodium-rich portion formation coating liquid may be used by adjusting the viscosity at a shear rate of 4 $sec^{-1}$ to a range of 1,000 mPa·s to 7,000 mPa·s.

In the formation of the rhodium-rich portion, the rhodium-rich portion formation coating liquid containing the rhodium precursor is arranged on the exhaust gas upstream side end of the exhaust gas purification catalyst device precursor, and thereafter suctioned from the exhaust gas downstream side end of the exhaust gas purification catalyst device precursor. Thereafter, firing may be carried out.

The range of the rhodium-rich portion in the depth direction of the catalyst coating layer can be adjusted by changing the content of the thickener in the rhodium-rich portion formation coating liquid and appropriately adjusting the viscosity of the coating liquid to the range described above. In other words, since the coating liquid having a low viscosity can penetrate more easily, the lower the viscosity of the coating liquid, the wider (deeper) the range of the rhodium-rich portion in the depth direction of the catalyst coating layer can be made, and since the coating liquid having a higher viscosity can penetrate less easily, the higher the viscosity of the coating liquid, the more narrow (shallower) the range of the rhodium-rich portion in the depth direction of the catalyst coating layer can be made.

Furthermore, the range of the rhodium-rich portion in the exhaust gas flow direction can be adjusted by changing the amount of solvent in the rhodium-rich portion formation coating liquid and adjusting the amount of the coating liquid. In other words, when the amount of coating liquid arranged on the exhaust gas upstream side end of the exhaust gas purification catalyst precursor is high, by suctioning, the coating liquid can spread over a wide (long) range in the exhaust gas flow direction of the rhodium-rich portion, and when the amount of the coating liquid is small, even if the coating liquid is suctioned, it is consumed in a narrow (short) range in the exhaust gas flow direction and does not reach the downstream side. Utilizing this fact, the range of rhodium-rich portion in the exhaust gas flow direction can be adjusted by changing the amount of solvent in the rhodium-rich portion formation coating liquid.

The exhaust gas flow concentration gradient of the rhodium-rich portion can be adjusted by changing the time of suctioning from the exhaust gas downstream side end after the rhodium-rich portion formation coating liquid has been arranged on the exhaust gas upstream side end of the exhaust gas purification catalyst device precursor. In other words, near the upstream side end of the exhaust gas purification catalyst device precursor, a relatively large amount of coating liquid comes into contact with the upper layer during the time from the arrangement of the coating liquid to suction, whereby more rhodium is carried thereon. Conversely, at positions slightly on the further downstream side from the upstream side end, after arrangement of the coating liquid, the remaining coating liquid moves due to suction, whereby a relatively small amount of coating liquid comes into contact with the upper layer. Thus, by changing the time from the arrangement of the coating liquid to suction, a difference in the amount of coating liquid which comes into contact with the upper layer between the upstream side end of the exhaust gas purification catalyst device precursor and a downstream side position slightly on the further downstream side moved from the upstream side end can be provided. Utilizing this fact, the degree of the concentration gradient of the rhodium-rich portion in the exhaust gas flow direction can be adjusted.

Firing, which is subsequently optionally carried out, can be carried out by a method of heating at a temperature of, for example, 400 to 800° C., and preferably 450 to 600° C., for a time of, for example, 5 minutes to 4 hours, and preferably 30 minutes to 3 hours. The ambient atmosphere during firing may be air.

According to the foregoing, the exhaust gas purification catalyst device of the present embodiment can be produced.

EXAMPLES

In the following examples, exhaust gas purification catalyst devices were produced by sequentially forming a lower layer and an upper layer on a substrate by a wet coating method using a cordierite honeycomb substrate (cell number: 600 cpsi, cell shape: hexagonal cross-section, wall thickness: 2 mil, substrate length: 84 mm), and thereafter forming a rhodium-rich portion on a part of the upper layer by an impregnation method, and thereafter, the exhaust gas purification catalyst devices were evaluated.

(Preparation of Lower Layer Formation Coating Liquid)

The lower layer formation coating liquid was prepared adding, in terms of mass per unit volume of the honeycomb substrate, 5.5 g/L palladium metal equivalent of palladium nitrate, 50 g/L of lanthana-alumina composite oxide, 30 g/L of ceria zirconia composite oxide, 5 g/L of barium sulfate, and an alumina sol binder to pure water, and thereafter stirring.

The lanthana content in the lanthana-alumina composite oxide used herein was 5% by mass in terms of $La_2O_3$. The ceria zirconia composite oxide contained small amounts of neodymia, lanthana and yttria, and the ceria content was 12% by mass in terms of $CeO_2$.

(Preparation of Upper Layer Formation Coating Liquid)

The upper layer formation coating liquid was prepared by adding, in terms of mass per unit volume of the honeycomb substrate, 0.18 g/L rhodium metal equivalent of rhodium nitrate, 55 g/L of lanthana-alumina composite oxide, 50 g/L of ceria zirconia composite oxide, and an alumina sol binder to pure water, and thereafter stirring.

The lanthana content in the lanthana-alumina composite oxide used herein was 5% by mass in terms of $La_2O_3$. The ceria zirconia composite oxide contained small amounts of neodymia, lanthana and yttria, and the ceria content was adjusted using materials having different ceria contents in each of the Examples and Comparative Examples.

(Preparation of Rhodium-Rich Portion Formation Coating Liquid)

The rhodium-rich portion formation coating liquid was prepared by adding to pure water, in terms of mass per unit volume of the honeycomb substrate, 0.74 g/L rhodium metal equivalent of rhodium nitrate and a predetermined amount of thickener (hydroxyethyl cellulose, produced by DaiCel Corporation), and thereafter stirring.

Example 1

(Production of Exhaust Gas Purification Catalyst Device)

A lower layer was formed on the substrate by pouring the lower layer formation coating liquid into the honeycomb substrate, blowing off unnecessary coating liquid with a blower, thereafter drying in a 120° C. dryer for 2 hours, and subsequently carrying out firing in a 500° C. electric furnace for two hours.

Next, an upper layer which does not have a rhodium-rich portion was further formed on the lower layer on the substrate by pouring the upper layer formation coating liquid into the substrate after formation of the lower layer, blowing off the unnecessary coating liquid using a blower, thereafter drying in a 120° C. dryer for 2 hours, and subsequently carrying out firing in a 500° C. electric furnace for 2 hours, whereby the exhaust gas purification catalyst device precursor was obtained.

The rhodium-rich portion formation coating liquid was poured from the exhaust gas flow upstream side end of the obtained exhaust gas purification catalyst device precursor, thereafter suctioned from the exhaust gas flow downstream side end, and subsequently firing was carried out in a 500° C. electric furnace for two hours, whereby the exhaust gas purification catalyst device of Example 1 was produced. Note that the concentration of the thickener in the rhodium-rich portion formation coating liquid used in Example 1 was 1% by mass.

(Analysis of Rhodium-Rich Portion)
(Analysis 1—Range in Coating Layer Depth Direction)

The depth direction range of the rhodium-rich portion was examined by filling the communication holes of the exhaust gas purification catalyst device with resin followed by crushing to obtain a sample and measuring the distribution of each element in the crushed sample under the following conditions using a field emission electron probe microanalyzer (FE-EPMA) (model name "JXA-8530F" produced by JEOL Ltd.).

Field of view magnification: 400 times
Beam diameter: minimum
Acceleration voltage: 20 kV
Irradiation current: 100 nA
Convergence time: 50 seconds
Resolution: 256×256

(Analysis 2—Ratio of Rhodium Contained in 50% of Upstream Side of Rhodium-Rich Portion)

A sample obtained by cutting out the upstream 50% portion of the rhodium-rich portion was ground completely to quantify the amount of rhodium, and the ratio of the amount of rhodium contained in the portion to the total rhodium contained in the rhodium-rich portion was calculated.

(Evaluation of Exhaust Gas Purification Catalyst Device)

A 50 hour durability evaluation was carried out by a method in which the obtained exhaust gas purification catalyst device was attached to the exhaust system of a V-8 engine, the temperature of the catalyst coating layer was set to 950° C., and the exhaust of gas in a stoichiometric atmosphere and a lean atmosphere was alternately repeated at fixed intervals. The circulation time for each repetition of each exhaust gas was 8 seconds for exhaust gas in stoichiometric atmosphere and 3 seconds for exhaust gas in lean atmosphere.

The exhaust gas purification catalyst device after the durability evaluation was attached to the exhaust system of an L4 engine, and the warm-up property of $NO_x$ purification at the time of engine start was evaluated. Specifically, exhaust gas at an exhaust gas mass flow rate air-fuel ratio (A/F) of 14.55 was supplied to the exhaust gas purification catalyst device under the condition of Ga=10 g/sec, and time until the NOx purification rate reached 50% (warm-up time T50) was examined. The evaluation results are shown in Table 1.

Examples 2 to 6

Exhaust gas purification catalyst devices were produced and evaluated in the same manner as Example 1 except that the content of thickening agent in rhodium-rich portion formation coating liquid, the concentrations of the coating liquids, and time from pouring the rhodium-rich portion formation coating liquid into the exhaust gas purification catalyst device precursor to suction were appropriately changed, and the length and depth of rhodium-rich portion and the ratio (concentration gradient) of rhodium in the range of 50% in the front of the rhodium-rich portion were changed. The evaluation results are shown in Table 1.

TABLE 1

| | Rh-Rich Portion | | | | | |
| --- | --- | --- | --- | --- | --- | --- |
| | Range | | Ratio to | Ratio of Rh | Amount | Eval |
| | Length from Upstream Side End (%) | Depth from Outermost Surface of Upper Layer (μm) | Total Rh in Upper Layer (%) | Contained in 50% Upstream Side Range (%) | of Ceria in Upper Layer (mass %) | Results Warm-Up Time T50 (sec) |
| Ex 1 | 20 | 14 | 75 | 57 | 10 | 22.0 |
| Ex 2 | 50 | 13 | 75 | 55 | 10 | 22.0 |
| Ex 3 | 50 | 13 | 60 | 55 | 10 | 22.5 |
| Ex 4 | 60 | 15 | 75 | 57 | 10 | 24.3 |
| Ex 5 | 100 | 25 | 75 | 58 | 10 | 24.4 |
| Ex 6 | 50 | 13 | 40 | 55 | 10 | 24.4 |

Referring to Table 1, in the exhaust gas purification catalyst devices of Examples 4 and 5, in which the rhodium-rich portion was present in greater than 50% of the length of the upper layer from the upstream side end and/or in a depth of greater than 18 μm from the outermost surface of the upper layer, as well as Example 6, in which the proportion of rhodium contained in the rhodium-rich portion did not satisfy 50% of the total rhodium contained in the upper layer, the warm-up time T50 was long.

Conversely, the warm-up times T50 of the exhaust gas purification catalyst devices of Examples 1 to 3, in which the rhodium-rich portion was present in a range of up to 50% of the length of the upper layer from the upstream end side of the upper layer and up to 18 μm from the outermost surface of the upper layer and in which the proportion of rhodium contained in the rhodium-rich portion was 50% to less than 100% of the total rhodium contained in the upper layer, were short as compared to Examples 4 to 6. It is believed that by concentrating the rhodium of the upper layer near the surface layer on the upstream side of the catalyst coating layer, contact between the rhodium and the exhaust gas is improved.

Example 7

An exhaust gas purification catalyst device was produced in the same manner as Example 2 except that the time from pouring the rhodium-rich portion formation coating liquid into the exhaust gas purification catalyst device precursor to suction was appropriately changed and the ratio (concentration gradient) of rhodium contained in the range of 50% of the upstream side of the rhodium-rich portion was changed. The evaluation results are shown in Table 2, along with the results of Examples 1 to 3.

By comparing Example 7 and Examples 1 to 3 in Table 2, it was confirmed that, in the predetermined exhaust gas purification catalyst device of the present invention, in the case in which rhodium equal to 50% or more of the rhodium contained in the rhodium-rich portion is present in the rhodium-rich portion in the range of up to 50% of the length of the rhodium-rich portion from the upstream side end of the exhaust gas flow, a short warm-up time T50 was exhibited, whereby the warm-up property was excellent. It is considered that the purpose of the present invention was thoroughly achieved by centralizing the rhodium of the upper layer on the upstream side of the catalyst coating layer.

Examples 8 to 13

Exhaust gas purification catalyst devices were produced and evaluated in the same manner as Example 1 except that compositions having specified ceria contents were used as the ceria zirconia composite oxide contained in the upper layer formation coating liquid, the concentration of the thickener in the rhodium-rich portion formation coating liquid, the concentrations of the coating liquids, and the time from pouring the rhodium-rich portion formation coating liquid into the exhaust gas purification catalyst device precursor to suction were appropriately changed, and the length and depth of the rhodium-rich portion and the ratio (concentration gradient) of rhodium in the range of 50% of the downstream side of the rhodium-rich portion were changed. The evaluation results are shown in Table 3, along with the results of Examples 1 to 3.

TABLE 2

| | Rh-Rich Portion | | | | | |
|---|---|---|---|---|---|---|
| | Range | | Ratio to | Ratio of Rh | Amount | Eval |
| | Length from Upstream Side End (%) | Depth from Outermost Surface of Upper Layer (μm) | Total Rh in Upper Layer (%) | Contained in 50% Upstream Side Range (%) | of Ceria in Upper Layer (mass %) | Results Warm-Up Time T50 (sec) |
| Ex 1 | 20 | 14 | 75 | 57 | 10 | 22.0 |
| Ex 2 | 50 | 13 | 75 | 55 | 10 | 22.0 |
| Ex 3 | 50 | 13 | 60 | 55 | 10 | 22.5 |
| Ex 7 | 50 | 13 | 75 | 40 | 10 | 24.3 |

TABLE 3

| | Rh-Rich Portion | | | | Eval Results |
|---|---|---|---|---|---|
| | Range | | Ratio to | Ratio of Rh | Amount | Ratio to |
| | Length from Upstream Side End (%) | Depth from Outermost Surface of Upper Layer (μm) | Total Rh in Upper Layer (%) | Contained in 50% Upstream Side Range (%) | of Ceria in Upper Layer (mass %) | Total Rh in Upper Layer (%) |
| Ex 1 | 20 | 14 | 75 | 57 | 10 | 22.0 |
| Ex 2 | 50 | 13 | 75 | 55 | 10 | 22.0 |
| Ex 3 | 50 | 13 | 60 | 55 | 10 | 22.5 |
| Ex 8 | 43 | 17 | 75 | 65 | 7 | 22.2 |
| Ex 9 | 30 | 17 | 75 | 60 | 15 | 22.3 |
| Ex 10 | 30 | 15 | 75 | 55 | 22 | 22.3 |
| Ex 11 | 50 | 13 | 75 | 55 | 5 | 24.5 |
| Ex 12 | 50 | 25 | 75 | 40 | 26 | 24.4 |
| Ex 13 | 50 | 13 | 75 | 55 | 30 | 24.1 |

Referring to Table 3, in the exhaust gas purification catalyst devices of Example 11, in which the content of ceria in the upper layer was 5% by mass, and Examples 12 and 13, in which the content of ceria in the upper layer exceeded 25% by mass, the warm-up time T50 was long.

Conversely, the warm-up times T50 of the exhaust gas purification catalyst devices of Examples 1 to 3 and 8 to 10, in which the content of ceria in the upper layer was greater than 5% by mass and 25% by mass or less, were short as compared to Examples 11 to 13. It is believed that this is because in the predetermined exhaust gas purification catalyst device of the present invention, the catalyst layer is maintained in an atmosphere near stoichiometry because the upper layer contains an appropriate amount of ceria, whereby the exhaust gas purification efficiency is improved.

Note that it has been confirmed that the predetermined exhaust gas purification catalyst device of the present invention is excellent in exhaust gas purification capacity when the space velocity (SV) of the exhaust gas is high, in addition to the warm-up property illustrated above as an experimental example.

REFERENCE SIGNS LIST 10 upper layer
11 rhodium-rich layer
12 other portions of the upper layer
20 lower layer
100 exhaust gas purification catalyst device
a range of the rhodium-rich portion in the direction of exhaust gas flow
b range of the rhodium-rich portion in the depth direction of the catalyst coating layer

The invention claimed is:

1. An exhaust gas purification catalyst, comprising:
an upper layer containing first carrier particles and rhodium, and
a lower layer containing second carrier particles,
wherein
the upper layer includes a rhodium-rich portion near the surface of the upper layer on the upstream side of the exhaust gas flow,
the existence range of the rhodium-rich portion is in a range of up to 50% of the length of the upper layer from an upstream side end of an exhaust gas flow and of up to 18 μm in the depth direction from an outermost surface of the upper layer, and
the rhodium-rich portion contains rhodium in an amount of 55% to less than 100% of the total rhodium included in the upper layer.

2. The exhaust gas purification catalyst according to claim 1, wherein the range of the rhodium-rich portion in an exhaust gas flow direction is up to 30% of the length from the upper layer exhaust stream flow upstream side end.

3. The exhaust gas purification catalyst according to claim 2, wherein the range of the rhodium-rich portion in the depth direction is up to 15 μm in the depth direction from the outermost surface of the upper layer.

4. The exhaust gas purification catalyst according to claim 1, wherein a content of ceria in the upper layer is greater than 5% by mass to 25% by mass or less, when the total mass of the first carrier particles in the upper layer is 100% by mass.

5. The exhaust gas purification catalyst according to claim 4, wherein the content of ceria in the upper layer is 7% by mass to 15% by mass, when the total mass of the first carrier particles in the upper layer is 100% by mass.

6. The exhaust gas purification catalyst according to claim 1, wherein rhodium equal to 50% or more of the rhodium included in the rhodium-rich portion is in the range of up to 50% of the length of the rhodium-rich portion from the upstream side end of the exhaust gas flow.

7. The exhaust gas purification catalyst according to claim 1, wherein the lower layer and the upper layer are present on a substrate.

8. The exhaust gas purification catalyst according to claim 1, wherein the lower layer constitutes a part or the entirety of a substrate, and the upper layer is present on the lower layer.

9. A method for the production of the exhaust gas purification catalyst according to claim 1, comprising the steps of:
providing a coating liquid including a rhodium precursor to an exhaust gas upstream side end of an exhaust gas purification catalyst precursor comprising an upper layer containing first carrier particles and rhodium and a lower layer containing second carrier particles, and thereafter suctioning from an exhaust gas downstream side end of the exhaust gas purification catalyst precursor.

* * * * *